United States Patent [19]

Cody et al.

[11] Patent Number: 5,667,694

[45] Date of Patent: Sep. 16, 1997

[54] PROCESS FOR THE REMOVAL OF HEAVY METALS FROM AQUEOUS SYSTEMS USING ORGANOCLAYS

[75] Inventors: Charles A. Cody, Robbinsville; Stephen J. Kemnetz, Trenton, both of N.J.

[73] Assignee: Rheox, Inc., Hightstown, N.J.

[21] Appl. No.: 520,317

[22] Filed: Aug. 28, 1995

[51] Int. Cl.$^6$ .................. C02F 1/28; C02F 1/42
[52] U.S. Cl. .................. 210/679; 210/688; 210/691
[58] Field of Search .................. 210/691, 688, 210/699, 692, 693, 694, 679

[56] References Cited

U.S. PATENT DOCUMENTS

| | | | |
|---|---|---|---|
| 2,367,384 | 1/1945 | Tymstra | 210/693 |
| 4,033,764 | 7/1977 | Colegate et al. | 210/688 |
| 4,054,515 | 10/1977 | Sawyer, Jr. | 210/688 |
| 4,100,065 | 7/1978 | Etzel | 210/688 |
| 4,133,755 | 1/1979 | Tarao et al. | 210/688 |
| 4,167,481 | 9/1979 | Cremers et al. | 210/36 |
| 4,386,010 | 5/1983 | Hildebrandt | 252/428 |
| 4,444,665 | 4/1984 | Hildebrandt | 210/660 |
| 4,473,477 | 9/1984 | Beall | 210/691 |
| 4,517,094 | 5/1985 | Beall | 210/691 |
| 4,549,966 | 10/1985 | Beall | 210/691 |
| 4,650,590 | 3/1987 | Beall | 210/691 |
| 4,726,710 | 2/1988 | Rosar et al. | 405/129 |
| 4,740,488 | 4/1988 | Fogler et al. | 502/84 |
| 4,866,018 | 9/1989 | Elliott | 501/148 |
| 4,916,095 | 4/1990 | Fogler et al. | 502/62 |
| 5,028,338 | 7/1991 | Hooykaas | 210/679 |
| 5,045,210 | 9/1991 | Chen et al. | 210/688 |
| 5,114,892 | 5/1992 | Clem | 501/141 |
| 5,151,155 | 9/1992 | Cody et al. | 162/5 |
| 5,346,566 | 9/1994 | White | 210/688 |
| 5,372,729 | 12/1994 | Hooykaas | 210/751 |
| 5,376,283 | 12/1994 | Hooykaas | 210/751 |
| 5,430,235 | 7/1995 | Hooykaas et al. | 588/252 |
| 5,512,526 | 4/1996 | Greco | 502/80 |

FOREIGN PATENT DOCUMENTS

560423 A1  9/1993  European Pat. Off. .

OTHER PUBLICATIONS

Chapter entitled "Bentonite" in: Carr, Donald, ed. 1994, Industrial Minerals and Rocks, 6th Edition—Society For Mining, Metallurey, and Exploration, Inc., Littleton, Colorado.

Hawley's Condensed Chemical Dictionary, 12th Edition, pp. 254, 856.

Webster's Ninth New Collegiate Dictionary, "sorb" definition.

Hawley's Condensed Chemical Dictionary, (1993) pp. 254, 856.

Primary Examiner—Cynthia L. Nessler
Attorney, Agent, or Firm—Michael J. Cronin

[57] ABSTRACT

This invention relates to a process for removing dissolved heavy metals including lead and radioactive contaminants from contaminated aqueous systems including aqueous soil systems. Such systems have resulted from Department of Defense activities and chemical manufacture, as well as from a large variety of past activities. An organically modified smectite clay, or organoclay, is used to treat these systems. Organoclays are the reaction product of smectite clays and quaternary ammonium compounds. The organoclay is brought in contact with system to be treated where it sorbs the heavy metal in the aqueous system onto the organoclay which sorbed complex is then removed by a variety of methods including flotation and air sparging.

18 Claims, 3 Drawing Sheets

SORPTION OF Pb$^{+2}$ ON ORGANOCLAY
ORGANOCLAY WAS PREPARED EX SITU FROM Pb$^{+2}$
STREAM AND USED AS A WET FILTER CAKE.

PROCESS FOR THE REMOVAL OF HEAVY METALS FROM AQUEOUS SYSTEMS USING ORGANOCLAYS

BACKGROUND OF THE INVENTION

1. Field of the Invention

The present invention relates to the removal of concentrations of heavy metals from aqueous systems, such as from electroplating baths, mine water discharge, seeps from chemical work drops, and in particular aqueous soil systems (which represent a subset of aqueous systems) where the soil is derived from urban soils, soils in vicinity of areas of heavy automobile usage, soil with agricultural pesticide residues or runoffs containing pesticide residues, as well as soil system's characteristic of those found at present or former chemical manufacturing facilities, mines, Department of Defense or Department of Energy sites, and facilities receiving demolition debris, hazardous wastes, or mixed wastes. Such soil systems are normally considered as aqueous soil systems since they contain some heavy metals, some mount of water, and large amounts of particulate material, or can be easily made into aqueous soil systems with the addition of water, whereas other types of aqueous systems contain heavy metals, solubles and limited amounts of particulate material.

Heavy metal contaminants include chromium, lead, mercury, strontium and nickel cadmium. These metals have become contaminants in aqueous systems as the results of activities including chemical manufacture, smelting, electroplating, wood treating, and covered metalworking operations, to name only a few areas, where such metals are used. Heavy metals also include cobalt, thorium, uranium, and the transuranics, particularly where created as a by-product of uranium, thorium and plutonium beneficiating ore milling and smelting to create commercial or military reactor target cores (fuel rods), industrial and medical radioisotopes, depleted uranium, counterweights, shielding, and the like. When found in soils these heavy metals can be removed by soaking the contaminated soil with water and utilizing modern remediation processes.

Commercial remediators presently use in situ vitrification, acid soil washing, chemical chelating techniques and stabilization/solidification to treat or fix heavy metal contaminants. These techniques generally utilize large volumes of water, have a significant adverse impact on soil and flora and are increasingly expensive. A large number of commonly used remediation technologies, including burning and incineration, and vapor extraction/soil venting, are not by their nature feasible for heavy metal removal. A heavy metal removal technology with the potential to use less water and be less destructive to soil structures, if soil is present, and natural flora has long been sought.

This invention relates to improvements relating to heavy metal removal from aqueous systems for waste volume reduction and removal of contaminants including lead, mercury, cadmium, uranium, cesium, thorium, cobalt, and other similar heavy metals.

The benefication of aqueous soil systems containing radioactive or non-radioactive heavy metals and the removal of these contaminants can also be achieved using the process of this invention. This inventive process can be combined with a variety of other methods, including the use of one or more standard, conventional techniques such as evaporation, precipitation, clarification, thickening, sludge filter pressing sand-bed filtration, fixed and moveable bed ion exchange, activated carbon purification, and soil neutralization techniques. To manage effluents which may be generated, additional conventional steps such as sludge solidification and organic oxidation may also be utilized so as to control fugitive emissions and minimize uncontrolled losses of other potential pollutants.

The organoclay-based process of this invention can be utilized in conjunction with most of the above techniques. The treatment process is targeted to treat relatively low levels of heavy metal contamination. Many prior art processes based on expensive and complicated operations, can be generally suited for fixed and centralized plant installations, but are not generally satisfactory for certain field soil remediation applications, where climactic conditions can be adverse. A simple system to remove heavy metals with relatively problem-free transportability and ease of operation has therefore long been desired.

2. Description of the Prior Art

The development of cost-efficient routes to remove concentrations of heavy metals from aqueous systems is of commercial interest to a large variety of North American private, commercial and public remediators. By aqueous system it is meant a system containing water and heavy metals, where the heavy metals are in ionic or complexed form, or both. Complexed form means the heavy metal ion has been electrically neutralized by one or more counter ions. Other constituents may also be present, such as soils, solubles, industrial wastes and fillers. Soil can be made up of all sorts of rocks, sands, minerals, decomposing organic mater, fossil remains and similar components.

There are many sites where heavy metal pollution requiring abatement has been discovered. Not only are there over 1,200 targeted NPL (National Priority Listing) "Superfund" sites, but there are over 50,000 further identified "State Superfund", DOD, and other such sites awaiting treatment. Recent estimates suggest the cost to remediate all of these sites will reach well into multiples of tens of billions of dollars.

As the nation continues to struggle with the cost of funding this cleanup, a consensus has emerged among lawmakers, the Executive Branch and concerned state government agencies to focus on implementing cleanups with the lowest possible cost, using practical, inexpensive and available technology. Last year, preliminary agreement was reached among government agencies and an insurance consortium to develop a pooled insurance fund and simplified review procedures to support remediation activities at contested sites. It is likely that this plan or something similar will be enacted during the present Congress, and that such an agreement will support the focus on lost efficiency and practicality with an improvement in the regulatory climate. It is estimated that five billion dollars will be spent on the site remediation during 1995 alone. It is hoped that such a focus will reverse the present trend toward costly and unproductive legal actions challenging the imposition of liability and high legal costs.

Outside the "Superfund-type" pollution area, application sites for heavy metal removal technology in industrial soil site remediation, mine remediation and DOD mixed waste sites include the following:

(a) Approximately one hundred thousand abandoned and active mine sites in the Western states await cleanup, at a cost not yet estimated. A portion of funds to be spent for remediation must be allocated to process heavy metals found in mine pits and ponds, soils, and mine waste (including overburden). A number of technology companies have commenced operations around these old, sometimes historical, mining centers, and will now attempt to "mine" the flow of federal, state, private and Superfund monies directed towards site cleanup.

(b) DOD "Mixed Wastes", which are most often comprised of radionuclide salts, organics and heavy metal industrial wastes. Large volumes of radionuclide- contaminated water and mixed stored at DOD sites await treatment. For example the Hanford, Wash. site has been the subject of feasibility projects which have themselves cost $3 billion dollars, and have resulted in the development of a cost estimate for actual clean-up which could exceed $35 billion dollars for this one location alone.

The separation, concentration, immobilization and disposal of heavy metal contaminants on a cost-efficient basis continues to be studied by both government agencies and private industry. Those involved in the disposal industry have also been searching for a variety of waste clean-up agents.

U.S. Pat. No. 4,167,481 describes that a cation exchanging clay, such as bentonite or montmorillonite, which is combined with a polyamine, such as tetraethylenepentamine, and the combination used in contact with solution to remove several metal ions, such as mercury, cadmium, copper, zinc, nickel and cobalt. The patent mentions that the addition of polyamines, which are capable of forming stable cationic complexes with most metal ions, to metal-containing aqueous solutions, has a pronounced synergistic effect on the adsorption of these metals. In particular, the patent teaches that tetraethylenepentamine in combination with phyllosilicates such as bentonite and montmorillonite is effective in reducing the concentration of copper and mercury to very low values, sometimes down to 10 ppb (parts per billion) or less. The patent further discloses formation of a cationic polyamide complex which is easily adsorbed in the cation exchanger and which is stabilized by a factor of about one thousand, as compared to the stability of the complex in solution. Recent U.S. Pat. No. 5,114,892 uses a mixture of bentonite clay and sodium salts of polyphosphoric acids to confine seawater containing double-charged cations of zinc, cadmium and nickel.

Both unmodified smectite clay and organically modified smectite clay have been used to remove organic contaminants from fossil ash and streams—see U.S. Pat. Nos. 4,740,488 and 4,726,710. Bentonite has been used to neutralize double-charged cations naturally present in seawater and individual waste—see U.S. Pat. No. 5,114,892.

U.S. Pat. No. 4,386,010 discloses that porous calcined mineral substrates treated with organic-substituted quaternary ammonium or phosphonium compounds are effective sorbents for the purification of a variety of aqueous liquids. The patent describes a process for removing organic and inorganic contaminants from liquids which comprises treating the solution with particles of a porous calcined mineral and quaternary ammonium or phosphonium compound. Exemplary minerals described are high-calcium bentonites, acid-activated bentonites and calcined heat-treated grades of attapulgite clay, with the temperatures of the heat treatment used generally above about 150° C. U.S. Pat. No. 4,444,665 teaches the use of attapulgite clay rendered substantially non-swelling, high-calcium bentonites, and acid-activated bentonites treated with a large-molecule quaternary ammonium compounds to remove organic and inorganic contaminants from process liquors.

Recent European Patent, EP 0,560,423 A1, discusses the use of an organoclay as an agent for fixing organic and inorganic impurities along with a clay platelet crystalline growth agent. The method, according to the invention, is characterized by the organic and inorganic impurity-containing material to be fixed to and/or enclosed in a clay material to be formed in situ. One example of the patent discusses a radioactive cation, $Cs^{137}$ and in particular, teaches its fixation with an organoclay and hardening agent.

U.S. Pat. No. 5,028,338 discloses a process for immobilizing environmental noxious organic, particularly aromatic, substances by absorbing them on a layered clay material modified by exchange with a quaternary ammonium compound, reducing the spacing of the layers of clay, and the mixing the clay material with a hardenable inorganic binder.

SUMMARY OF THE INVENTION

According to an important aspect of the present invention, a process for removal of heavy metals from aqueous systems is provided, which comprises:

(a) contacting an aqueous system containing heavy metals dissolved in ionic and/or complexed form with one or more organically modified smectite-type clays for a period of time sufficient for the heavy metals to be sorbed by the organically modified smectite-type clay; and (b) removing the organoclay/heavy metals sorbed complex from the aqueous system.

The process removes heavy metals from aqueous systems. Organoclays and/or organoclays and organic anions are used to collect heavy metals from such systems including metals such as $Pb^{2+}$, $Hg^{2+}$ and $Ni^{2+}$. The organoclay/heavy metal sorbed complex is then removed from the system, for example, by flotation and filtering as described hereafter.

DESCRIPTION OF THE PREFERRED EMBODIMENTS

Figure 1:
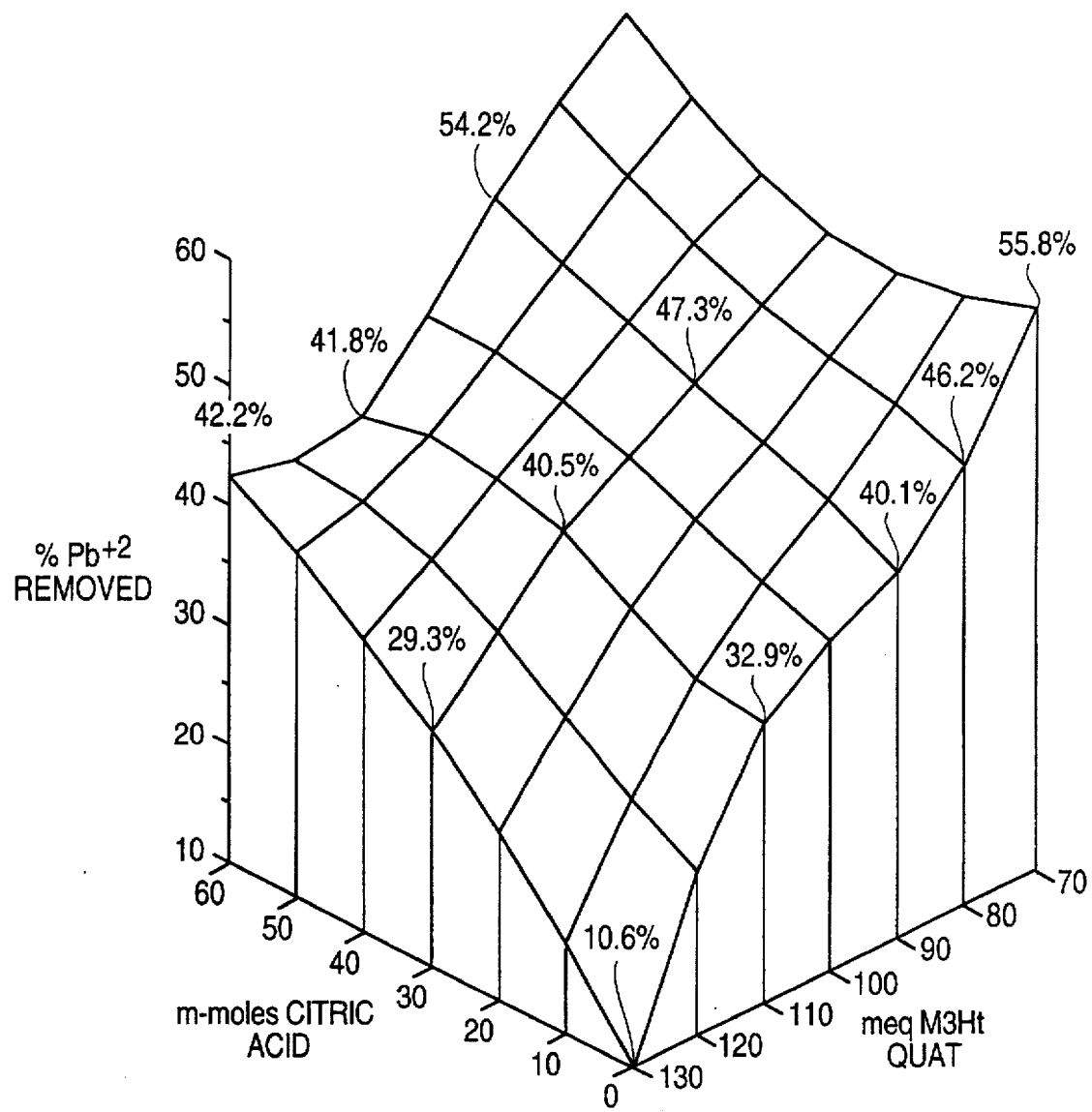
FIGS. 1 to 2 show the sorption of lead and mercury by the organoclays of this invention made using various amounts of quaternary ammonium compounds. The figures are explained at greater length during the discussion of Examples 1 and 2 below.

Not being bound by theory, applicants believe that heavy metal in ionic or complexed form when present in aqueous systems migrate to the surface of an organoclay dispersed in water and are attracted to and held by the same charged sites on the clay surface that were previously exchanged with positively charged quaternary ammonium ions. Thus, a relatively weakly bound organoclay-heavy metal sorbed complex results when the organoclay is placed in an aqueous system containing dissolved heavy metal ions and further, since the organoclay is hydrophobic the organoclay may be readily removed from the aqueous solution by a wide variety of techniques, such as settling, centrifugation or using air sparging to float out the complex, captured upon a fiborous mat or by attachment to fiborous or bead-like particles, with subsequent removal.

Increased efficiency of heavy metal collection results (on a heavy metal weight to organoclay weight basis) from the in situ formation of the organoclay, or the use of wet organoclay cake. The in situ formation of the organoclay proceeds by adding separately quaternary amonium salts and smectite clay to the aqueous system to be treated. Since the clay is added untreated (and clay is hydrophilic) it will become highly dispersed in the aqueous fluid so that subsequent ion exchange with quaternary ammonium ions into a hydrophobic organoclay initially results in a system of extremely large surface area that attracts the heavy metal ions. In time the hydrophobic organoclay/heavy metal complex flocculates into large clusters or aggregates which can be air sparged, centrifuged, settled or filtered out of the solution.

In this text the term in situ means the formation of an organoclay from a clay and quaternary ammonium compound in the aqueous system containing the heavy metal. In this text, the term ex-situ refers to an organoclay formed outside of and then added to the aqueous system to be remediated. There are two sub classes of ex-situ organoclay treatment agents; (1) the wet organoclay cake formed during organoclay manufacturer and (2) dried organoclay cake material which also may be ground.

The organoclay's tenacity for capture of heavy metal in water can be used to treat hazardous soils, industrial wastes, fillers, etc. by forming an aqueous hazardous waste mixture that in effect causes the heavy metals to pass into the aqueous phase. Thus, lead contanimented soil can be mixed with acidic water, for example, whereby the lead will disolve as $Pb^{2+}$; subsequent treatment of the water with in situ formed organoclay will form the organoclay/heavy metal sorbed complex that can be removed from the aquous soil system by air sprarging. There are a number of different steps in the sequence that may be successfully employed as long as the organoclay and solubilized heavy metal are both present in the aquous system at the same time.

It has become well documented that heavy metals, such as lead, mercury or uranium can leach from contaminated solids into soil and ground water aquifers. This leaching problem is further complicated in regions where adverse environmental conditions such as acid rain are prevalent. A method used at this time for the remediation of contaminated soil is fixation of the heavy metal in a cement matrix, U.S. Pat. No. 5,028,338. This treatment minimizes the amount of heavy metals that are leachable as determined by the EPA-issued "Toxicity Characteristic Leaching Procedure" (TCLP). In recent years the EPA now not only regulates the amount of leachable lead but also the total amount of lead present in the soil. If the total mercury or lead in a given soil sample exceeds EPA maximum, then that soil sample is not a candidate for stabilization but must be removed. In this text the term heavy metal generally means a metal whose specific gravity is around 5.0 g/cc or greater. Two heavy metals that are included in the invention but have specific gravities less than 5.0 g/cc are strontium (2.60) and barium (3.50).

Soil samples containing high levels of lead are presently washed using acidic aqueous solutions to remove the lead from the soil to meet EPA guidelines. This allows the soil to be reclaimed, after neutralization. The main embodiment of this invention is a process where an organically modified clay is used to treat the acidic aqueous waste containing heavy metals dissolved as contaminants with the subsequent removal of the organoclay containing heavy metals complex. The organoclay sorbs the heavy metal contaminant from the aqueous soil and is then removed from the aqueous stream by processes such as filtering, settling, air sparging, etc. The selective removal of the heavy metals allows the acid solution to be recycled to further extract more heavy metals from the soil, without the need for bulk neutralization of the system. Being able to recycle the acid offers an excellent economic advantage to the overall process. The organoclays used in this invention can be formed in situ or ex situ from the waste stream and still be effectively utilized for the removal of heavy metals. Judicious selection of the organoclay removal method can lead to significant economies doing remediation. The use of air sprarging, surface collection and collection on a porous mat of fibers allows a small amount, relative to the volume of the aqueous system, of organoclay/heavy metal sorbed complex to be recovered for disposal. Conventional removal techniques, such as filtering, filter beds, sedimentation and centrifigation require large volumes of water to be transported and pumped at considerable expense. Other inventive collection methods which are economically attractive include plating out of the organoclay/heavy metal sorbed complex onto a thin film of plastic, or Mylar, fiber mat, beads, plastic sieve or other high surface collection devices, such as material contained in a porous mechanism.

Organoclays are formed using water swellable smectite clay (such as bentonite or hectorite) which is reacted with quaternary ammonium compounds. The quaternary ammonium compound used will affect the resulting organoclay's sorption potential and sparging efficiency. Typical compounds useful for the invention are methyl trihydrogenated tallow ammonium chloride (M3Ht) and dimethyl dihydrogenated tallow ammonium chloride (2M2Ht).

Quaternary ammonium salts which are useful in accordance with the invention include those having the formula:

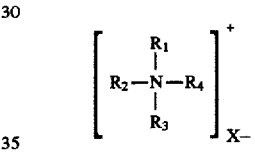

wherein $R_1$ comprises a lineal or branched aliphatic hydrocarbon group having from 1 to about 30 carbon atoms; $R_2$, $R_3$ and $R_4$ are independently selected from the group consisting of (a) lineal or branched aliphatic groups having from 1 to about 30 carbon atoms; (b) ethoxylated groups containing from 1 to about 80 moles of ethylene oxide; and (c) hydrogen; and $X^-$ comprises an anion, preferably chloride.

The raw materials used to make the quaternary amonium compounds can be derived from natural oils such as tallow, soya, coconut and palm oil. The aliphatic groups in the above formula may also be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Additional examples of useful aromatic groups, that is benzyl and substituted benzyl moieties, include materials derived from, e.g., benzyl halides, benzhydryl halides, trityl halides, α-halo-α-phenylalkanes wherein the alkyl chain has from 1 to 22 carbon atoms, such as 1-halo-1-phenyloctadecane; substituted benzyl moieties, such as those derived from ortho-, meta- and para-chlorobenzyl halides, para-methoxybenzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as those derived from 2-halomethylnaphthalene, 9-halomethylanthracene and 9-halomethylphenathrene, wherein the halo group comprises chloro, bromo, or any other such group which serves as a leaving group in the nucleophilic attack of the benzyl type moiety such that the nucleophile replaces the leaving group on the benzyl type moiety.

Additional useful aromatic-type substituents include phenyl and substituted phenyl, N-alkyl and N,N-dialkyl anilines, wherein the alkyl groups contain between 1 and 22 carbon atoms; ortho-, meta- and para-nitrophenyl, ortho-, meta- and para-alkyl phenyl, wherein the alkyl group contains between 1 and 22 carbon atoms, 2-,3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as phenol, or aralkyl such as benzyl alcohols; and fused ring aryl moieties such as naphthalene, anthracene, and phenanthrene.

Useful quaternary ammonium salts for purposes of the instant invention include hydrophobic quaternary ammonium salts, such as monomethyl trialkyl quaternaries and dimethyl dialkyl quaternaries, as well as hydrophilic quaternary ammonium salts, such as water-dispersible, ethoxylated quaternary ammonium compounds, and mixtures thereof.

Some examples of suitable hydrophobic quaternary ammonium compounds to make organoclays are Methyl trihydrogenated tallow ammonium chloride:

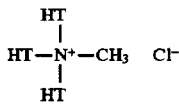

Dimethyl dihydrogenated tallow ammonium chloride:

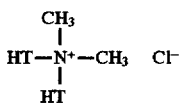

Dimethyl dibehenyl ammonium chloride:

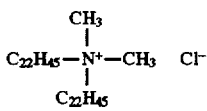

wherein HT=hydrogenated tallow.

Another group of organoclays useful as heavy metal sorbing agents are organoclays containing intercalated anions, see U.S. Pat. No. 4,517,112, for example. In these materials one or more anions have been complexed with the quaternary amonium ion before, during or after organoclay formation. These anions can be employed to enhance the organoclays heavy metal sorption efficiency. Some representatives anions useful for this application include citric, 12-amino dodecanonicate, tartaric and EDTA.

A preferred quaternary ammonium salt for purposes of the invention for use in a floatation process, as described hereafter, comprises a quaternary ammonium salt that contains at least one, preferably two or three, hydrocarbon chains having from about 8 to about 30 carbon atoms; and either no hydrophilic carbon chains or having hydrophilic radicals having a total of about 9 moles of ethylene oxide or less.

The organoclay of this process is generally used in amounts of from about 5 to about 200 times of the total weight of heavy metals to be removed.

The process of the invention is capable of simultaneously removing heavy metal contaminates from a number of systems. Examples of types of systems which may be treated in accordance with the invention include those selected from the group consisting of soil systems, pools of water, mining operations, mine discharge areas, leaching operations, and DOD nuclear weapon sites.

When an organically modified smectite-type clay is employed in the invention, the clay is preferably selected from the group consisting of crude hectorite, crude bentonite, beneficiated hectorite, beneficiated bentonite, spray dried hectorite and mixtures thereof. Other smectite-type clays known in the art may be utilized.

A preferred organically modified smectite-type clay for purposes of the instant invention comprises the reaction product of:

(a) a smectite-type clay having a cation exchange capacity of at least 50 milliequivalents per 100 grams of pure clay; and (b) one or more quaternary ammonium salts in an amount of from about 40% to about 200% of the cation exchange capacity of the smectite-type clay.

The smectite-type clay can be sheared in slurry form prior to reaction with the quaternary ammonium salt, or treated in solid form with a pugmill or similar apparatus.

The present invention contemplates both solid and aqueous slurry forms of organically modified smectite-type clays as agents in the process of the invention.

According to the present invention, applicants have discovered a process for removal of heavy metal from aqueous systems, which comprises:

(a) contacting an aqueous system containing heavy metal contaminants dissolved in ionic and/or complexed form with an agent selected from the group consisting of:
  (i) a mixture of one or more quaternary ammonium salts and one or more smectite-type clays which form an organically modified smectite clay; and
  (ii) one or more organically modified smectite-clays; and (b) sorbing heavy metal on to the organoclay to form a complex and;

(c) recovering the organoclay/heavy metal sorbed complex from the aqueous system.

It should be understood that either a organically modified clay formed externally, or an organically modified day in which the quaternary ammonium salt produces the resultant organoclay in situ by reaction with the clay in the aqueous system, can be employed in processes that employ a combination of floatation and filtering removal techniques. An organoclay made from two different quaternary ammonia salts varying in their properties would be within the teachings of the invention. In this regard, quaternary ammonium salts having both hydrophobic and hydrophilic groups may be employed.

The preparation of the quaternary ammonium compounds utilized in the inventive formulations can be carried out by techniques well-known in the art. For example, when preparing a quaternary ammonium salt, one skilled in the art would prepare a dialkyl secondary amine, for example, by the hydrogenation of nitriles (see U.S. Pat. No. 2,355,356), and then form the methyl dialkyl tertiary amine by reductive alkylations using formaldehyde as a source of the methyl radical. According to procedures set forth in U.S. Pat. No. 3,136,819 and U.S. Pat. No. 2,775,617, a quaternary amine halide may then be formed by adding benzyl chloride or benzyl bromide to the tertiary amine. The disclosure of the above three patents are incorporated herein by reference. See also pending U.S. application Ser. No. 08/385,295 which describes in detail the procedures used to make quaternary ammonium compounds.

Likewise, smectite-type clay itself may be employed in accordance with the invention in admixture with a quaternary ammonium salt.

The clays which may be used in the present invention are smectite-type clays having a cationic exchange capacity of at least 50 milliequivalents per 100 grams of clay, 100% active clay basis, as determined by the well-known ammonium acetate or methylene blue methods.

Smectite-type clays are well-known in the art and are commercially available from a variety of sources. Prior to use in the invention, the clays may preferably be converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder.

Representative smectite-type clays useful in accordance with the present invention are the following:
Montmorillonite

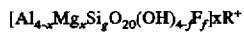

where $0.55 \leq x \leq 1.10$, $f \leq 4$ and R is selected from the group consisting of Na, Li, NH$_4$, and mixtures thereof;
Beidellite

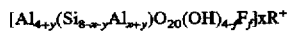

where $0.55 \leq x \leq 1.10$, $0 \leq y \leq 0.44$, $f \leq 4$ and R is selected from the group consisting of Na, Li, NH$_4$, and mixtures thereof;
Hectorite

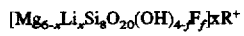

where $0.57 \leq x \leq 1.15$, $f \leq 4$ and R is selected from the group consisting of Na, Li, NH$_4$, and mixtures thereof;
Saponite

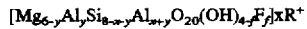

where $0.58 \leq x \leq 1.18$, $0 \leq y \leq 0.66$, $f \leq 4$ and R is selected from the group consisting of Na, Li, NH$_4$, and mixtures thereof; and
Stevensite

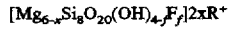

where $0.28 \leq x \leq 0.57$, $f=4$ and R is selected from the group consisting of Na, Li, NH$_4$, mixtures thereof.
Bentonite

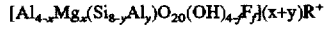

where $0<x<1.10$, $0<y<1.10$, $0.55 \leq (x+y) \leq 1.10$, $f \leq 4$ and R is selected from the consisting of Na, Li, NH$_4$, and mixtures thereof;

The preferred clay used in the present invention to make an organoclay is bentonite. Bentonite and its properties are described at length in the chapter entitled "Bentonite," in Carr, D., ed. 1994, *Industrial Minerals and Rocks* 6th Edition (published by the Society For Mining, Metallurgy and Exploration, Colorado).

It will be understood that both sheared and non-sheared forms of the above-listed smectite clays may be employed. In addition, the smectite clay employed can be either crude (containing gangue or non-clay material) or beneficiated (gangue removed). The ability to use crude clay in the smectite-type clay of this invention represents a substantial cost savings, since the clay beneficiation process and conversion to the sodium form do not have to be carried out. The organoclay agent can be prepared by admixing a smectite-type clay, one or more organic salts and water together, preferably at temperatures with the range of from 20° C. to 100° C., and most preferably from 35° C. to 80° C., for a period of time sufficient for the organic compound to react with the clay. The reaction is followed by filtering, washing, drying and grinding the organoclay product. When in slurry form, the organoclay product does not need to be filtered, washed, dried or ground.

The clay is preferably dispersed in water at a concentration of from about 1 to 80%, most preferably from about 2 to 8% by weight. Optionally, the slurry may be centrifuged to remove non-clay impurities which constitute about 10% to 50% or the starting clay composition.

Removal of the organoclay/heavy metal sorbed complex can be accomplished via a large variety of known techniques such as sedimentation, centrifugation, filtration or air sparging/flotation.

The process of the invention preferably operates in accordance with floatation techniques or filtration techniques, both well-known in the art, although other processes can also be utilized. Recent U.S. Pat. No. 5,366,634 lists various removal techniques useful for the invention including microfiltration systems and filter press systems.

As a preferred process, once the soil/water mix has been contacted with the organoclay, the aqueous soil system or washings therefrom may then be, after dilution, subjected to air sparging in order to float or move the organoclay/heavy metal sorbed complex to the surface, where it is removed by skimming or similar techniques.

Lead can be removed up to as high as about 10% of the weight of organoclay using this invention, i.e. an organoclay to heavy metal ratio of 10:1. Concentrations of 400 ppm heavy metal can be reduced to 5 ppm with a single treatment, and 5 ppm reduced to less than 0.1 ppm with a second treatment. For mercury a single organoclay treatment can reduce 2000 ppm to less than 200 ppm. As shown in the below examples the efficiency for mercury removal can be higher than for lead. Most important there is little or no poisoning by non-heavy metal ions using the inventive organoclay absorption mechanism.

The following examples are given to illustrate the invention, but are not deemed to be limiting thereof. All percentages and ratio given throughout the specification are based upon weight, 100% weight basis, unless otherwise indicated.

EXAMPLE 1

A series of tests were conducted to determine the heavy metal sorption potential of a methyl trihydrogenated tallow ammonium chloride (M3Ht)—commercial name Witco Kemamine Q-9701C/citric acid/bentonite organoclay. In this experiment eleven organoclay samples were first prepared at various M3Ht/citric acid/bentonite ratios and were used as a sorbent to remove lead and mercury (in separate experiments) from a pH 2 aqueous solution.

Each organoclay sample was prepared from a beneficiated bentonite clay slurry at 2.87% solids in water. The quat reaction was performed in a 3 liter stainless steel beaker, equipped with baffles and agitated using a 6 blade turbine mixer. The clay slurry was charged to the 3 liter beaker and heated to 65 ° C. Separately, various amounts of M3Ht and citric acid (70–130 milliequivalence M3Ht/0–60 millimoles citric acid/100 grams bentonite clay) were heated to 65° C., mixed thoroughly and added to the clay slurry. The reaction was held at 65° C. for 30 minutes at which time the slurry was vacuum filtered. The percent solids was determined for each sample by drying to constant weight in a 105° C. oven and the wet filter cake used to treat waste streams containing lead or mercury.

A solution to duplicate an aqueous soil system was prepared containing approximately 2000 ppm lead using 896.7 grams deionized water. The water was acidified to pH 2 using concentrated nitric acid then 3.30 grams of lead(II) acetate trihydrate was dissolved in this solution. Then 63.3 grams of this solution (~0.12 gram Pb) was treated with 4.0 grams of each organoclay sample previously prepared.

Since the amount of water in each filter cake varied, additional water was added as needed to each respective sample to keep the lead concentration fixed (final adjusted concentration ~1480 pm). The organoclay samples was mixed with the lead stream for 30 minutes and allowed to stand overnight at which point the organoclay was air sparged out of suspension. This was accomplished by submerging a glass frit bubbler into the solution and sparging the system with air bubbles. The organoclay would float to the water's surface were it was removed with a narrow glass tube connected to a vacuum reservoir. The remaining solution was analyzed by XRF for lead and compared against an untreated control solution. The test results are summarized in Table I and plotted in FIG. 1.

TABLE I

Sorption of $Pb^{+2}$ on Organoclay
(M3Ht/Citric Anion/Bentonite Ex-Situ - wet cake)

| Sample Description meq M3Ht/Millimoles Citric Acid | XRF Pb Counts | Percent Pb Removed |
|---|---|---|
| Control | 0/0 | 29,789 | — |
| | 90/0 | 17,846 | 40.1 |
| | 110/0 | 19,983 | 32.9 |
| | 130/0 | 26,635 | 10.6 |
| | 90/30 | 15,696 | 47.3 |
| | 110/30 | 17,728 | 40.5 |
| | 130/30 | 21,063 | 29.3 |
| | 90/60 | 13,631 | 54.2 |
| | 110/60 | 17,333 | 41.8 |
| | 130/60 | 17,224 | 42.2 |
| Control | 0/0 | 31,014 | — |
| | 70/0* | 13,719 | 55.8 |
| | 80/0* | 16,701 | 46.2 |

*These organoclays could not be air sparged out of the system; therefore they were removed by vacuum filtration.

EXAMPLE 2

Figure 2:
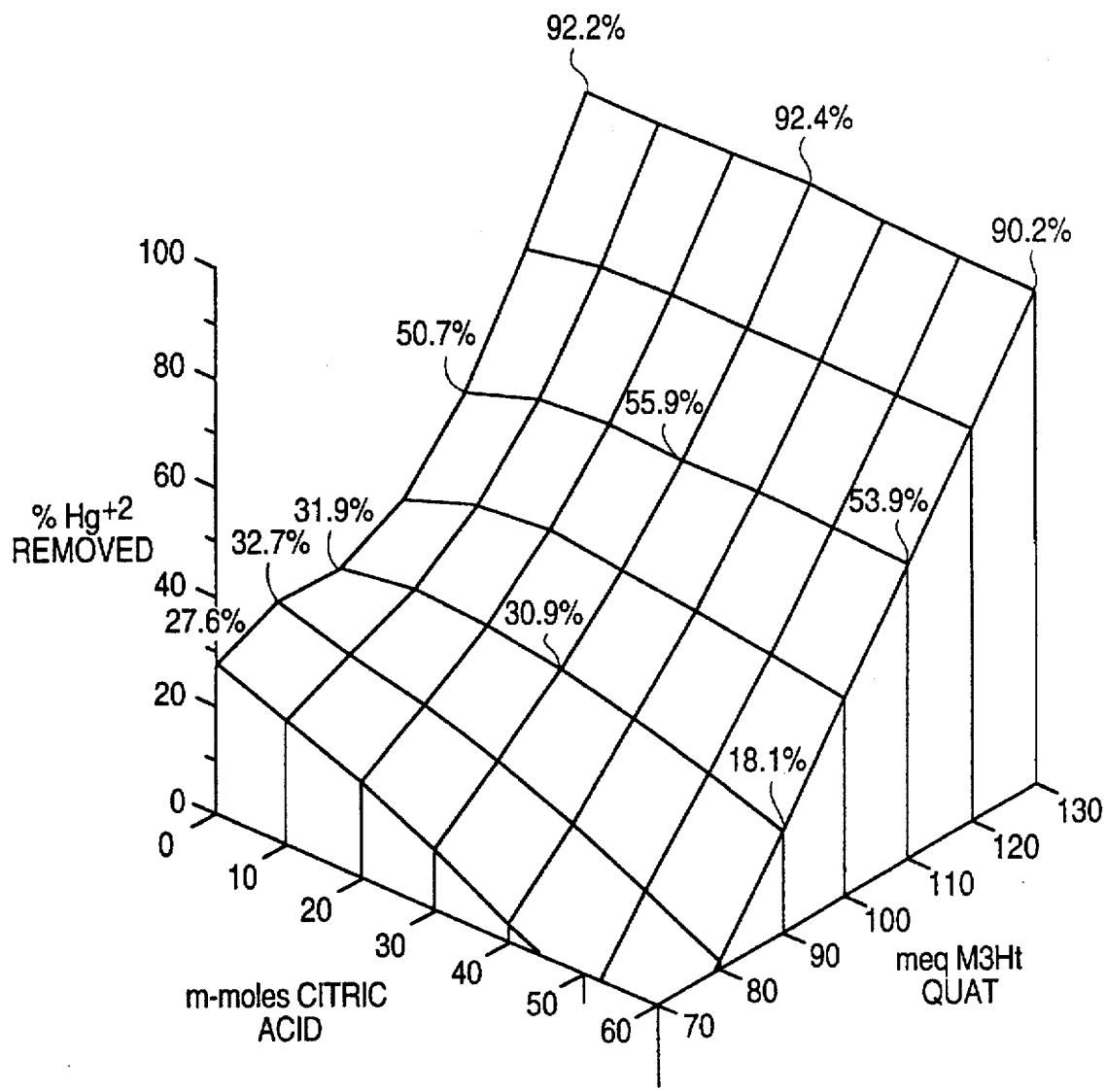

This example was conducted using the same technique as Example 1 except that mercury(II) chloride was used in place of lead(II) acetate trihydrate. The mercury solution was prepared using 897.56 grams deionized water that was acidified to pH2 using concentrated nitric acid. Then 2.44 grams mercury(II) chloride was added and mixed until dissolved. The XRF test results are shown in Table II and a plot shown in FIG. 2.

TABLE II

Sorption of $Hg^{+2}$ on Organoclay
(M3Ht/Citric Anion/Bentonite Ex-Situ - wet cake)

| Sample Description meq M3Ht/Millimoles Citric Acid | XRF Hg Counts | Percent Hg Removed |
|---|---|---|
| Control | 0/0 | 21,388 | — |
| | 90/0 | 14,563 | 31.9 |
| | 110/0 | 10,548 | 50.7 |
| | 130/0 | 1,668 | 92.2 |
| | 90/30 | 14,790 | 30.8 |
| | 110/30 | 9,433 | 55.9 |
| | 130/30 | 1,622 | 92.4 |
| | 90/60 | 17,519 | 18.1 |
| | 110/60 | 9,865 | 53.9 |
| | 130/60 | 2,106 | 90.2 |
| Control | 0/0 | 21,331 | — |
| | 70/0* | 15,453 | 27.6 |
| | 80/0 | 14,353 | 32.7 |

*These organoclays could not be air sparged out of the system, therefore they were vacuum filtered.

EXAMPLE 3

The following example demonstrates that organoclays can be formed in situ with the waste containing-system and will effectively function as a sorbent for lead. Various organoclay samples were prepared at different organic to clay ratios using 110–115 milliequivalents dimethyl dihydrogenated tallow ammonium chloride [2M2Ht] Kemamine Q-9702C plus 0–60 millimoles citric acid per 100 grams hectorite clay. In this experiment 675.79 grams of beneficiated hectorite clay slurry (3.19% solids) was diluted with 219.25 grams deionized water and acidified to pH2 using concentrated nitric acid. Then 2.19 grams lead(II) acetate trihydrate was dissolved in 20 grams deionized water and added to the clay slurry. The clay slurry thickened considerably so an additional 124.21 grams deionized water was added to reduce the viscosity (~1150 ppm Pb). Then 75 grams of the solution was heated to 65° C. under agitation using a magnetic bar and reacted with various amounts of 2M2Ht and citric acid which was also heated to 65° C. The heating continued and the sample was kept for 30 minutes at 65° C. and then cooled to room temperature. In order to normalize each solution to compensate for water loss during heating, the weight of each reaction solution was adjusted back to its original total weight using deionized water.

Figure 3:
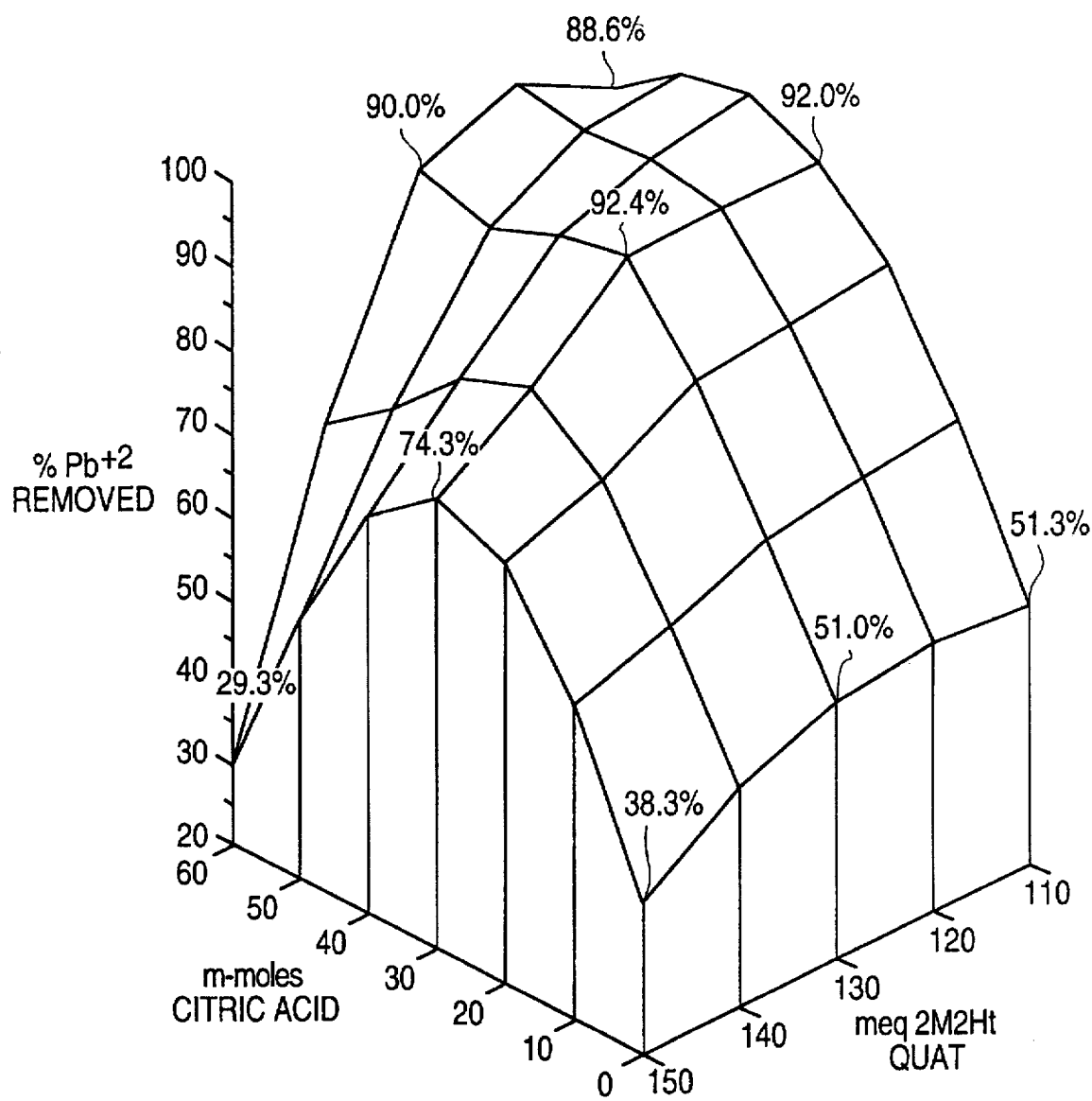
FIG. 3 shows the sorption of lead by a organoclay formed in situ using the same units of the previous figures. This figure is further explained during the discussion of Example 3.

Each sample was then air sparged to remove the organoclay sample from suspension. This was accomplished by submerging a glass frit bubbler into the solution and sparging the system with air bubbles. The organoclay was floated to the water's surface where it was removed using a narrow glass tube that was connected to a vacuum reservoir. The remaining solution was analyzed by XRF for total lead and compared against the untreated control solution. The test results are summarized in Table III and FIG. 3.

TABLE III

Sorption of $Pb^{+2}$ on Organoclay
(M3Ht/Citric Anion/Hectorite In Situ)

| Sample Description meq M3Ht/Millimoles Citric Anion | XRF Pb Counts | Percent Pb Removed |
|---|---|---|
| Control | 0/0 | 23,555 | — |
| | 110/0 | 11,370 | 51.3 |
| | 130/0 | 11,440 | 51.0 |

TABLE III-continued

Sorption of Pb$^{+2}$ on Organoclay
(M3Ht/Citric Anion/Hectorite In Situ)

| Sample Description meq M3Ht/Millimoles Citric Anion | XRF Pb Counts | Percent Pb Removed |
|---|---|---|
| 150/0 | 14,405 | 38.2 |
| 110/30 | 1,860 | 92.0 |
| 130/30 | 1,782 | 92.4 |
| 150/30 | 6,003 | 74.3 |
| 110/60 | 2669 | 88.6 |
| 130/60 | 2,343 | 90.0 |
| 150/60 | 16,501 | 29.3 |

EXAMPLE 4

This example used the same techniques as Example 3 except that mercury(II) chloride was used in place of lead(II) acetate trihiydrate. In this experiment the same charges were used as in Example 3 except 1.62 grams of mercury(II) chloride was dissolved in the pH2 solution. The test results from this experiment are summarized in Table IV.

TABLE IV

Sorption of Hg$^{+2}$ on Organoclay
(M3Ht/Citric Anion./Hectorite In Situ)

| Sample Description meq M3Ht/Millimoles Citric Anion | XRF Hg Counts | Percent Hg Removed |
|---|---|---|
| Control | 0/0 | 20,511 | — |
| | 110/0 | 1,809 | 91.2 |
| | 130/0 | 713 | 96.5 |
| | 150/0 | 304 | 98.5 |
| | 110/30 | 1,427 | 93.0 |
| | 130/30 | 3,005 | 85.4 |
| | 150/30 | 529 | 97.4 |
| | 110/60 | 1,330 | 93.5 |
| | 130/60 | 1,639 | 92.0 |
| | 150/60 | 378 | 98.2 |

EXAMPLE 5

The following experiment was run to demonstrate the advantages of treating acidified aqueous solutions containing heavy metals with in-situ organoclay, ex-situ wet cake organoclay and ex-situ organoclay (dried and milled). In this experimental series two types of organoclay were prepared and tested 1) methyl trihydrogenated tallow ammonium chloride (Kemamine Q-9701C Witco Chemical) reacted with bentonite clay and 2) dimethyl dihydrogenated tallow ammonium chloride (Kemamine Q-9702C Witco Chemical) reacted with hectorite clay. Both organoclays were prepared by reacting 100 meq quaternary ammonium chloride/100 g clay in an aqueous slurry heated to 65° C. The clay slurry was first charged to a 3 liter stainless steel beaker equipped with bottles, six blade turbine mixer, heating mantle and thermometer. The clay slurry at ~3% solids, was heated to 65° C. under agitation. Separately, the quaternary ammonium chloride was also heated to 65° C. and added to the clay slurry. The reaction was held for 30 minutes at 65° C. at which time it was filtered in a Buchner funnel and washed with deionized water to remove residual salts. A portion of each wet organoclay filter cake was dried at 105° C. in a forced air oven and then milled one pass through a centrifuged mill using a 0.5 mm screen. The wet filter cake was broken up using a spatula and blended on a roller mill to obtain a uniform wet cake. A small portion of the wet cake was analytically weighed and dried to constant weigh in a 105° C. forced air oven to accurately determine the percent solids of the filter cake (both cakes ranged from 15%–18% solids). The dry organoclays and wet organoclay filter cakes were used as ex-situ samples to treat heavy metal waste streams.

A solution of Pb(NO$_3$)$_2$ in deionized water was prepared at ~2000 ppm Pb at a pH of 2.0 using HNO$_3$. In each experiment 60 g of the Pb solution (0.12 g Pb) was employed and treated with organoclay. Since the ex-situ wet organoclay cake treatment would add additional water to the lead waste stream, all samples had to be normalized with a water addition that was equivalent to the maximum amount of water added with the wet filter cake. Each solution was heat to 65° C. prior to treatment with each respective organoclay treatment. All samples were agitated for 30 minutes using a magnetic stirrer, cooled to room temperature, renormalized to compensate for evaporation, filtered and the filtrate analyzed by XRF for lead counts.

The in-situ samples were prepared by adding clay (hectorite and bentonite) to the normalized stock lead solution and heating to 65° C. Then each respective quaternary ammonium chloride (dry, powder) was added and reacted for 30 minutes under agitation from a magnetic stirrer. The samples were cooled to room temperature, normalized to adjust for evaporation and filtered. The filtrates were analyzed by XFR for lead counts and test results are shown in Table V. A control sample, not treated, had an XRF Pb count of 26.023.

TABLE V

Sorption of Pb$^{+2}$ On Organoclays Prepared In Situ
And Ex Situ From The Lead Stream
XFR Pb Counts/% Lead Removed

| Organoclay | Ex Situ | Ex Situ Wet Cake | In Situ |
|---|---|---|---|
| M3H/Bentonite | 25,455/2.2% | 24,387/6.3% | 17,925/31.1% |
| 2M2Ht/Hectorite | 19,524/25.5% | 16,372/37.1% | 3,663/85.9% |

This experiment clearly demonstrates that wet cake organoclay is more preferred than dried material, in removing lead, and that in situ organoclay treatment is even more efficient than treatment with wet cake.

What is claimed is:

1. A process for removing heavy metal contaminants from aqueous systems containing heavy metals dissolved in ionic form which comprises:

(a) contacting an aqueous system or washings thereof with an agent consisting of a mixture of one or more smectite clays and one or more quaternary ammonium salts having the formula:

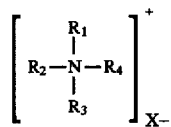

wherein R$_1$ comprises a lineal or branched aliphatic hydrocarbon group having 1 to about 30 carbon atoms; R$_2$, R$_3$ and R$_4$ are independently selected from the group consisting of (a) lineal or branched aliphatic groups having from 1 to about 30 carbon atoms; (b) aromatic and substituted aromatic groups; and (c) hydrogen and X$^-$ is chloride; to form an organically modified smectite clay in the system;

(b) sorbing heavy metal contaminants on to the organically modified smectite clay to form an organically modified smectite clay/heavy metal complex; and (c) recovering the organically modified smectite clay/heavy metal sorbed complex from the aqueous system.

2. The process of claim 1, wherein said organically modified smectite clay comprises the reaction product of:

(a) a smectite clay having a cation exchange capacity of at least 50 milliequivalents per 100 grams of clay; and (b) one or more quaternary ammonium salts in an mount of from about 40% to about 200% of the cation exchange capacity of the smectite clay.

3. The process of claim 1, wherein said smectite clay is sheared prior to reaction with said quaternary ammonium salt.

4. The process of claim 1, wherein said aqueous system contains organic contaminants in addition to heavy metals.

5. The process of claim 1, wherein the organically modified smectite clay comprises at least one organically modified clay made using methyl trihydrogenated tallow ammonium chloride.

6. The process of claim 1, wherein the organically modified smectite clay comprises an organically modified smectite clay formed with a quaternary ammonium salt having both hydrophobic and hydrophilic groups.

7. The process of claim 1, carried out in a floatation process.

8. The process of claim 1, wherein the organically modified smectite clay comprises a reaction product of hectorite clay and dimethyl dihydrogenated tallow ammonium chloride.

9. The process of claim 1, wherein the organically modified smectite clay comprises a reaction product of bentonite clay and octadecyl methyl ammonium chloride.

10. The process of claim 1, wherein the smectite clay is selected from the group consisting of crude hectorite, crude bentonite, beneficiated hectorite, beneficiated bentonite, spray dried hectorite and mixtures thereof.

11. The process of claim 1, carried out in a combined floatation and filtration process.

12. The process of claim 1, wherein the aqueous system is selected from the group consisting of soil systems, mine water discharges, electroplating baths and seeps from chemical work drops.

13. A process for removing heavy metals selected from the group consisting of lead and mercury from an aqueous system which contains lead or mercury dissolved in ionic form which comprises:

(a) contacting an aqueous system or washings thereof containing lead, mercury or both with one or more organically modified smectite clays comprising smectite clay reacted with one or more quaternary ammonium salts having the formula:

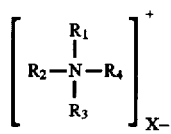

wherein $R_1$ comprises a lineal or branched aliphatic hydrocarbon group having 1 to about 30 carbon atoms; $R_2$, $R_3$ and $R_4$ are independently selected from the group consisting of (a) lineal or branched aliphatic groups having from 1 to about 30 carbon atoms; (b) aromatic and substituted aromatic groups; and (c) hydrogen and $X^-$ is chloride;

(b) sorbing some or all of the lead or mercury or both onto the organically modified smectite clay to form an organically modified smectite clay complex with said lead or mercury;

(c) removing said complex from the aqueous system.

14. The process of claim 13, wherein the organoclay is formed in situ in the aqueous system.

15. The process of claim 13, wherein said organoclay is in aqueous slurry form prior to addition to the aqueous system.

16. The process of claim 13 wherein said aqueous system contains organic contaminants in addition to heavy metals.

17. The process of claim 13, wherein the removal of said complex is carried out by a floatation process.

18. The process of claim 13, wherein the aqueous system is selected from the group consisting of soil systems, mine water discharges, electroplating baths and seeps from chemical work drops.

* * * * *